Oct. 14, 1941.    A. ROSS    2,258,812
REAR FENDER
Filed Sept. 16, 1939

Inventor
Arthur Ross
By
Blackmore, Spencer & Flint
Attorneys

Patented Oct. 14, 1941

2,258,812

UNITED STATES PATENT OFFICE 2,258,812

REAR FENDER

Arthur Ross, Detroit, Mich., assignor to General Motors Corporation, Detroit, Mich., a corporation of Delaware Application September 16, 1939, Serial No. 295,189

3 Claims. (Cl. 280—152)

This invention relates to fenders and has particular reference to a combined rear tail light and cover for the inlet opening to the fuel tank. The invention is particularly adaptable to rear fenders of automotive vehicles.

The novelty of the invention consists in providing an opening at the rear part of the fender and securing a frame in the opening. The rearwardmost part of the frame has a window therein to act as the tail light while the forwardmost part of the frame has a hinged cover which conceals the fuel inlet to the gasoline tank.

Figure 1:
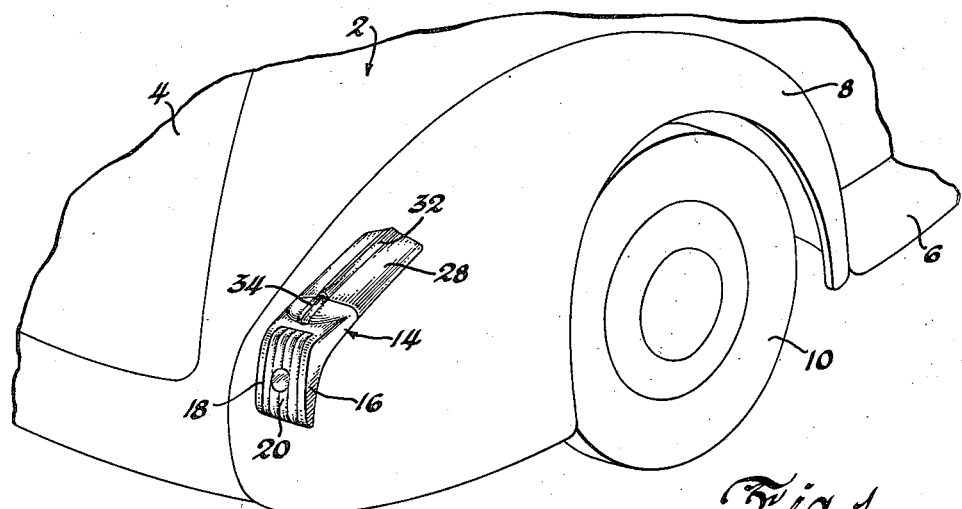
Figure 1 is a perspective view of the rear part of an automotive vehicle showing the rear fender with the invention applied.
Figure 2:
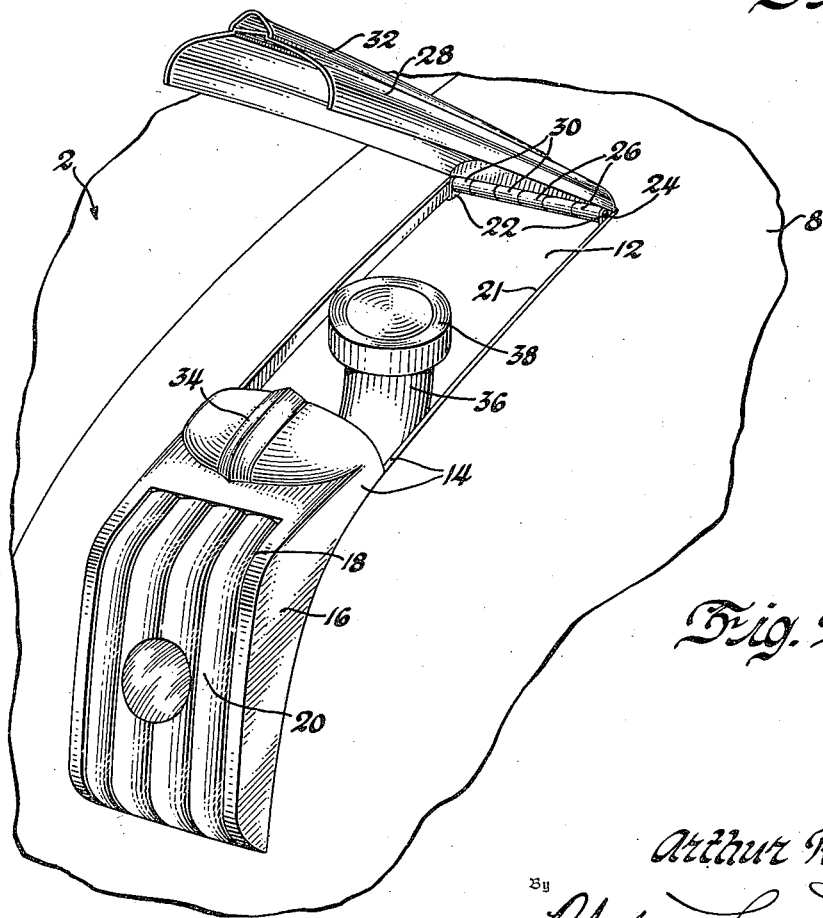
Figure 2 is a view similar to Figure 1 but showing the parts of the invention on an enlarged scale and with the hinged cover partially raised.

Referring to the drawing, the numeral 2 indicates an automotive vehicle body as a whole. The body has the rear deck door 4, the running board 6, and the rear fender 8. The vehicle is supported on the usual wheels one of which is indicated at 10.

The rear fender is provided with an opening 12 in which a frame 14 is mounted. The metal of the fender 8 at the edges of the opening 12 is preferably inturned or downturned and a frame 14 secured to the inturned edges. The frame 14 has the rear part 16 which is provided with an opening 18 in which there is secured the rear window 20 behind which is the usual incandescent bulb or other source of light to illuminate the window 20 which acts as a tail light for the vehicle. The frame 14 has the lateral bars 21 and extends entirely around the opening 12. The frame at its forwardmost part is provided with the ears 22 in which the hinge pintle 24 is mounted. One set of hinge eyes 26 is secured to the cover 28, while the other set of hinge eyes 30 is secured to the forward cross bar or member of the frame 14.

The cover 28 may have the decorative rib 32 thereon and this rib may be continued as at 34 on the rear part 16 of the frame 14.

The fuel inlet 36 is positioned below the cover 28 and has the removable closure or cap 38. By raising the cover 28 the cap 38 and inlet pipe 36 are accessible and enable the refilling of the fuel tank.

I claim:

1. In a rear fender construction for a motor vehicle, said fender having an opening, a frame rigidly mounted in the opening, said frame having an opening at each end thereof, a stationary tail light window rigidly mounted in and completely filling the opening in the rear of the frame, and a cover hinged to the frame and when closed concealing the front opening therein and forming a continuation of the upper part of the frame, said cover when open enabling access to a fuel inlet beneath the fender.

2. In a rear fender construction for a motor vehicle, said fender having an opening, a frame secured in the opening, a stationary tail light window rigidly mounted in the frame at one end thereof and completely filling said end, and a hinged cover mounted at the other end of the frame and spaced from the window and adapted to cover a second opening in the frame, said cover when in closed position forming a continuation of the upper part of the frame, and when open enabling access to a fuel inlet beneath the fender.

3. In a rear fender construction for a motor vehicle, said fender having an opening, a frame rigidly secured in the opening at the perimeter thereof and extending entirely therearound, said frame having an opening in the rear end thereof, a stationary tail light window rigidly secured in the frame opening and completely filling the same, and a cover hinged at the forward edge of the frame and spaced from the window and adapted to cover a second opening in the frame, said cover when in closed position forming a continuation of the frame and when open enabling access to a fuel inlet beneath the fender.

ARTHUR ROSS.